United States Patent
Hirota et al.

(10) Patent No.: US 7,646,727 B2
(45) Date of Patent: Jan. 12, 2010

(54) RETRANSMISSION METHOD FOR DIGITAL BROADCAST AND ITS BROADCAST RECEIVING DEVICE

(75) Inventors: Atsushi Hirota, Yokohama (JP); Seijiro Yasuki, Fuchu (JP)

(73) Assignee: Kabuhsiki Kaisha Toshiba, Tokyo (JP)

( * ) Notice: Subject to any disclaimer, the term of this patent is extended or adjusted under 35 U.S.C. 154(b) by 474 days.

(21) Appl. No.: 11/508,819

(22) Filed: Aug. 24, 2006

(65) Prior Publication Data

US 2007/0086459 A1    Apr. 19, 2007

(30) Foreign Application Priority Data

Sep. 30, 2005  (JP) .............................. 2005-288625

(51) Int. Cl.
H04L 12/26 (2006.01)
H04L 12/28 (2006.01)
H04J 1/00 (2006.01)

(52) U.S. Cl. ..................... 370/252; 370/390; 370/486
(58) Field of Classification Search ................. 370/252, 370/254, 255, 390, 400, 401, 486, 487
See application file for complete search history.

(56) References Cited

U.S. PATENT DOCUMENTS

| | | | |
|---|---|---|---|
| 6,111,612 A * | 8/2000 | Ozkan et al. ................. 348/465 |
| 6,271,893 B1 * | 8/2001 | Kawaguchi et al. .......... 348/725 |
| 6,529,526 B1 * | 3/2003 | Schneidewend .............. 370/486 |
| 7,061,880 B2 * | 6/2006 | Basilier ........................ 370/312 |
| 7,451,468 B2 * | 11/2008 | Yoon ............................ 725/39 |
| 7,474,621 B2 * | 1/2009 | Mimura et al. ............... 370/241 |
| 2005/0140574 A1 * | 6/2005 | Tamura .......................... 345/9 |

FOREIGN PATENT DOCUMENTS

| | | |
|---|---|---|
| JP | 2001-186497 | 7/2001 |
| JP | 2002-118841 | 4/2002 |
| JP | 2002-325236 | 11/2002 |
| JP | 2004-364140 | 12/2004 |
| JP | 2005-038340 | 2/2005 |
| JP | 2005-065255 | 3/2005 |

* cited by examiner

*Primary Examiner*—Hong Cho
(74) *Attorney, Agent, or Firm*—Pillsbury Winthrop Shaw Pittman, LLP

(57) ABSTRACT

An IP broadcast transmitting device comprises means for acquiring and collecting channel tuning information and program-related information from broadcast signals of each broadcasting station from which the broadcast signals are distributed, means for updating and managing the information, means for distributing the information independently from IP multicast-distributions of the broadcast signals, and means for distributing a service area tuning list with IP multicast-distribution information of the broadcast signals and distribution positions of the channel tuning information and the program-related information of the broadcast signals described therein.

11 Claims, 12 Drawing Sheets

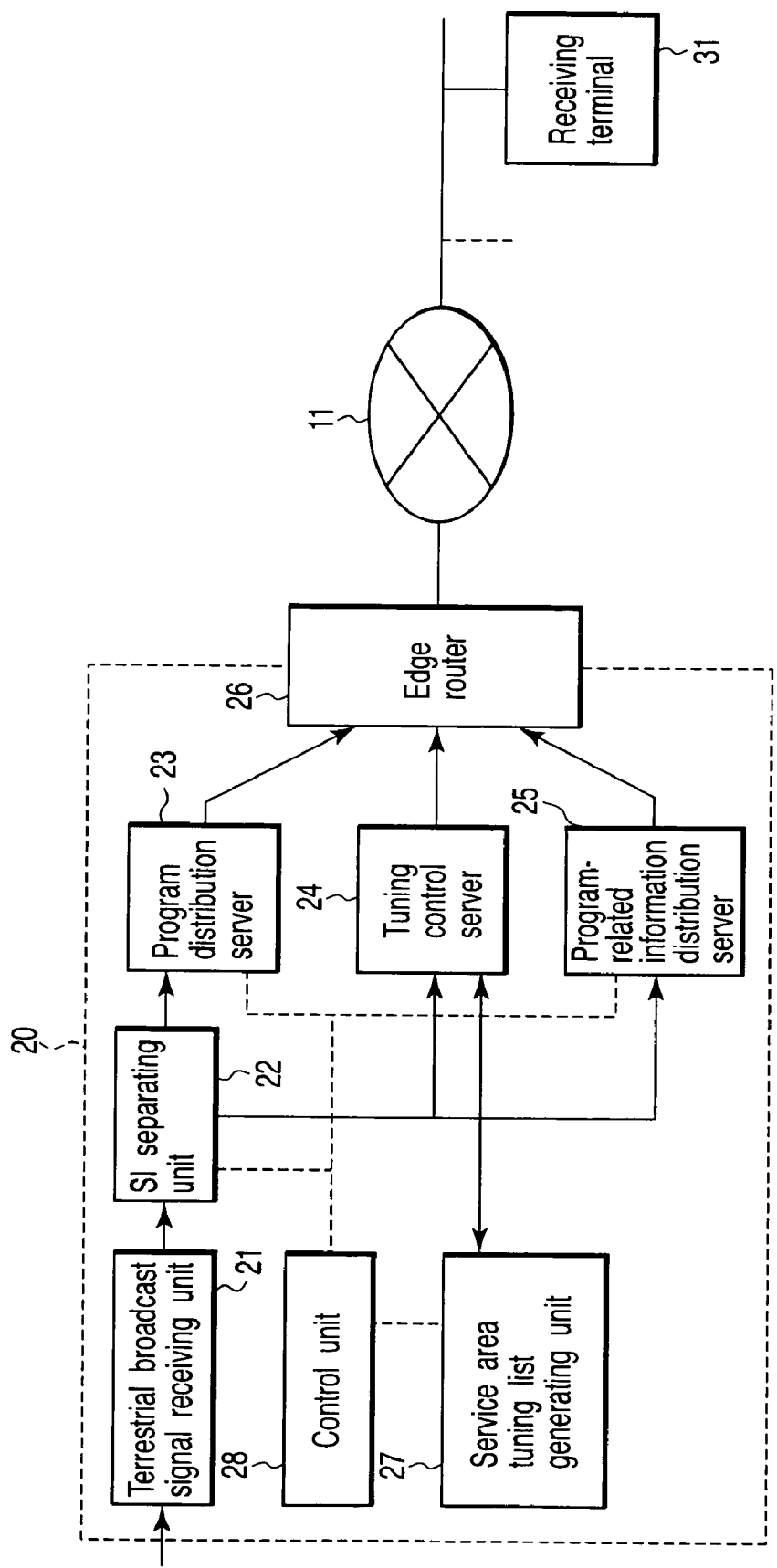
F I G. 1

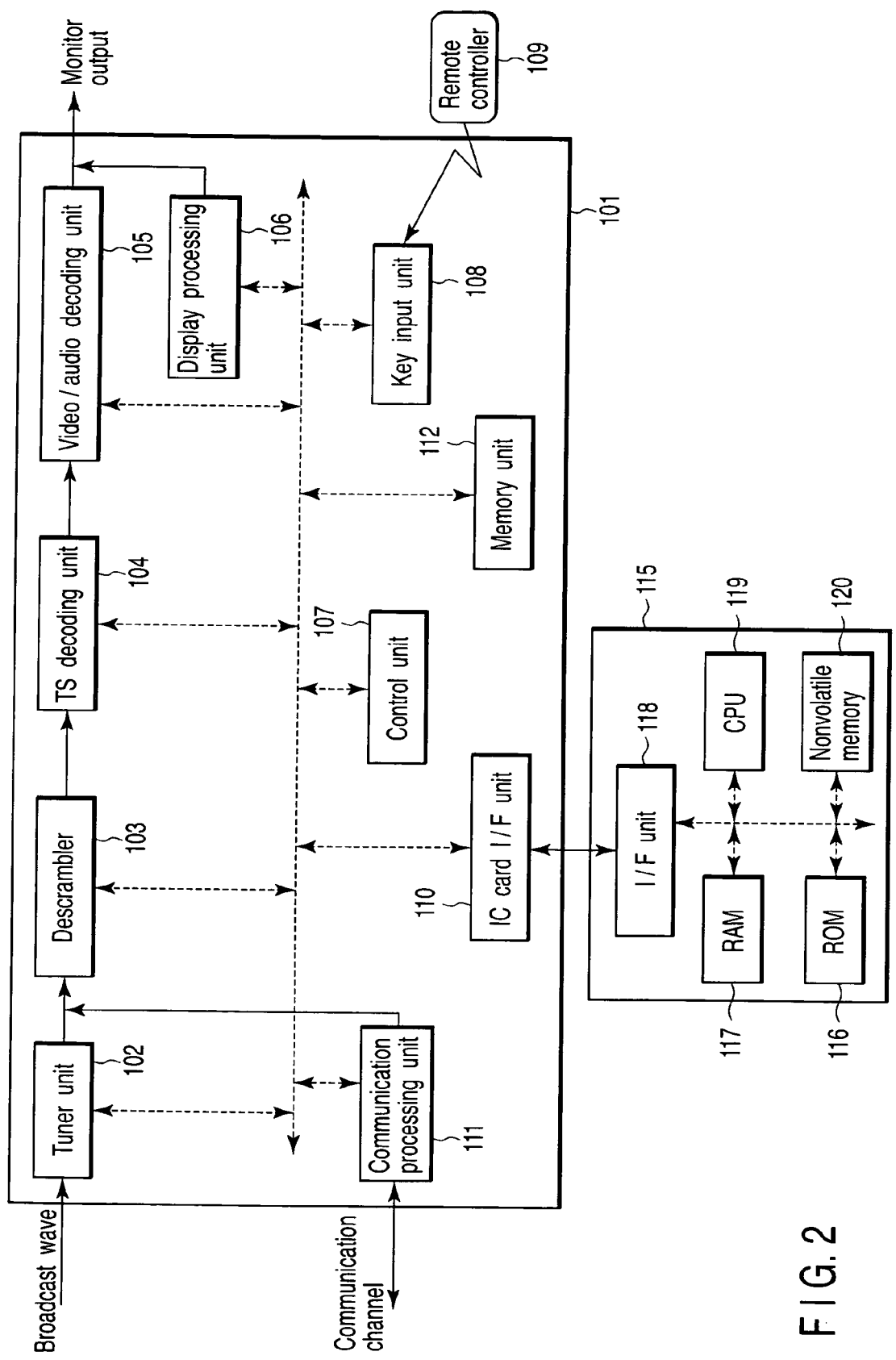
F I G. 2

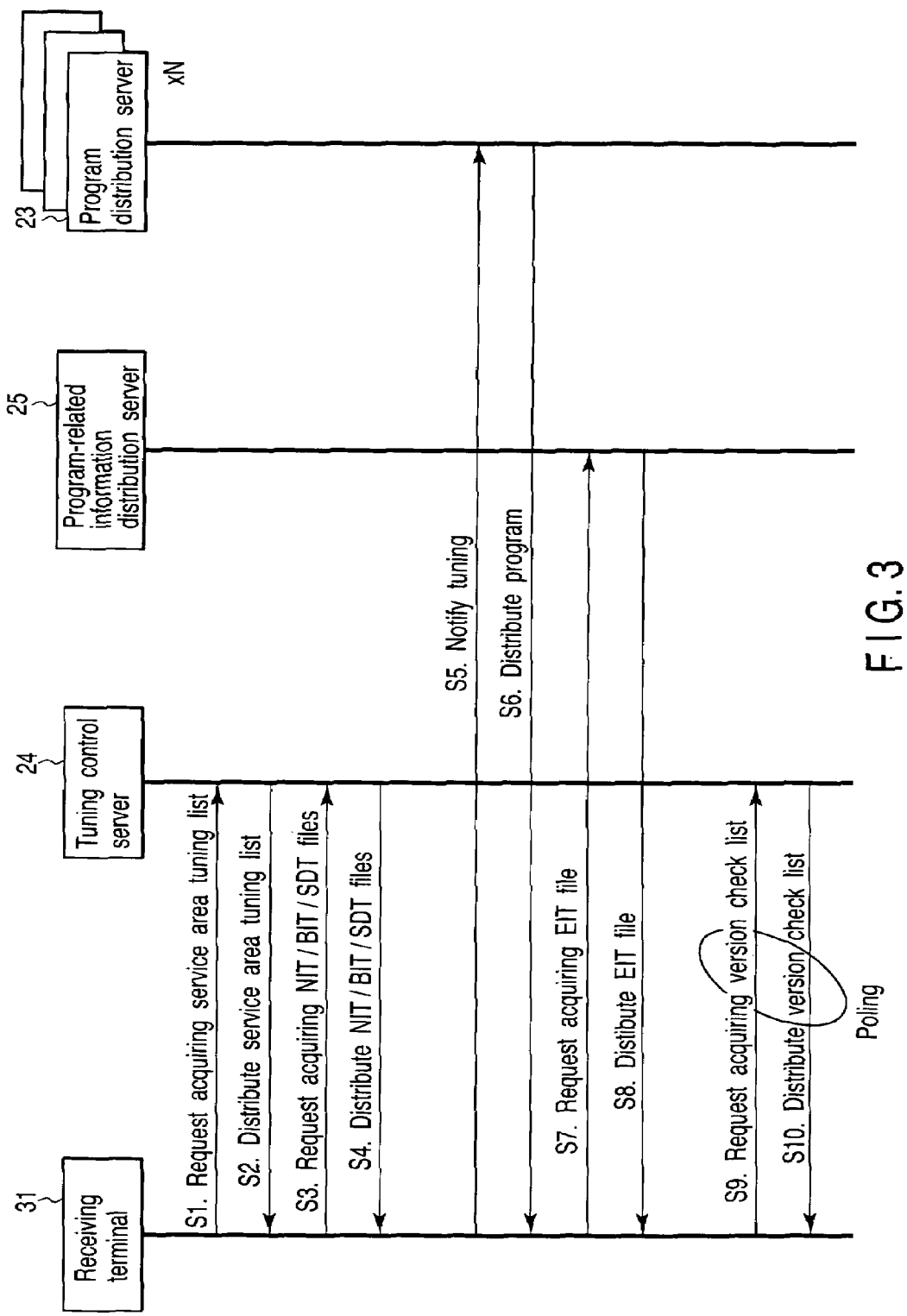
F I G. 3

```
<serviceAreaTransportChannelList>
<ip_area_code>tokyo</ip_area_code>          ← 4-1
<list_ver>1.2</list_ver>                    ← 4-2
<tans_ch_num>8</tans_ch_num>                ← 4-3

<networkInfo>                               ← 4-4
                                                              4-7
<transport_stream_id>0x1234</transport_stream_id>  ← 4-5   4-6
<mc_address="v6">FF01:0:0:0:0:0:0:101</mc_address>
<source_address="v6">FF01:0:0:0:1:0:0:101</source_address>
<port_num>xx</port_num>
<ip_fec>1</ip_fec>                          ← 4-13
<ews_flag>0</ews_flag>                      ← 4-14
</networkinfo>
  .
  .
  .
<locationInfo>
<nit_url>www.aaa.co.jp/tokyo/050505.nit</nit_url>       ← 4-8
<bit_url>www.aaa.co.jp/tokyo/050505.bit</bit_url>       ← 4-9
<sdt_url>www.aaa.co.jp/tokyo/050505.sdt</sdt_url>       ← 4-10
<eit_1_url>www.aaa.co.jp/tokyo/050505-1.eit</eit_1_url> ⎫ 4-11
<eit_2_url>www.aaa.co.jp/tokyo/050505-2.eit</eit_2_url> ⎭
<ver_check_1_url>www.aaa.co.jp/tokyo/050505.vc1</ver_check_1_url> ⎫
<ver_check_2_url>www.aaa.co.jp/tokyo/050505.vc2</ver_check_2_url> ⎬ 4-12
<ver_check_3_url>www.aaa.co.jp/tokyo/050505.vc3</ver_check_3_url> ⎭
</locationInfo>
</serviceAreaTransportChannelList>
```

FIG. 4

(The case of NIT/SDT/BIT)
<versionCheckList>
<ip_area_code>tokyo</ip_area_code> ← 5-1A
<list_ver>2.0</list_ver> ← 5-2A
<listInfo type="network">
    <nit_file_ver>2.0</nit_file_ver>
    <bit_file_ver>2.0</bit_file_ver> ← 5-3A
    <sdt_file_ver>2.0</sdt_file_ver>
</listInfo>
</versionCheckList>

(Example of version check list)

FIG. 5A (The case of EIT)
<versionCheckList>
<ip_area_code>tokyo</ip_area_code> ← 5-1B
<list_ver>2.0</list_ver> ← 5-2B
<listInfo type="event">
    <eit_1_file_ver>5.2</eit_1_file_ver> ← 5-3B
    <eit_2_file_ver>5.0</eit_2_file_ver> ← 5-4B
    <eit_3_file_ver>5.0</eit_3_file_ver> ← 5-5B
</listInfo>
</versionCheckList>

(Example of version check list)

FIG. 5B

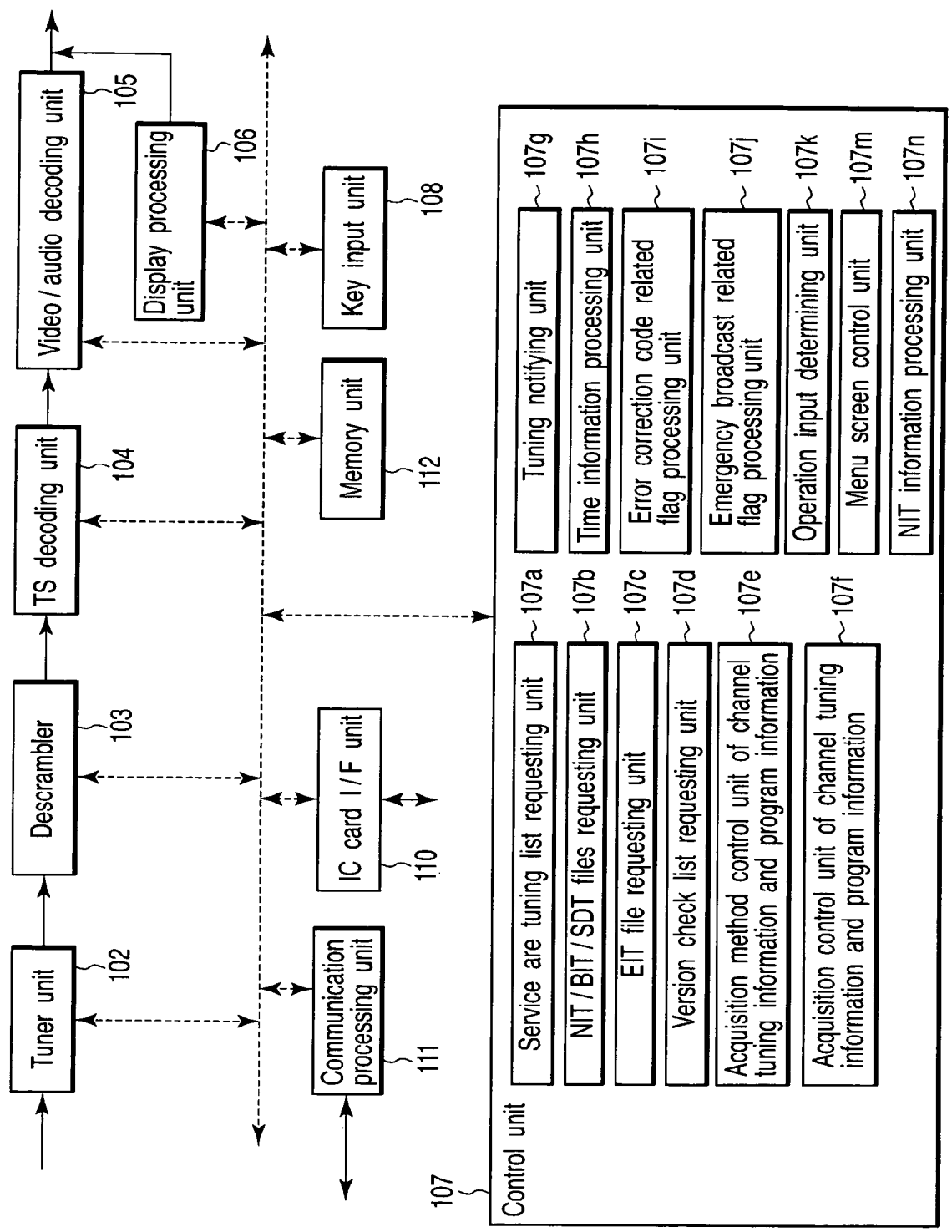
F I G. 8

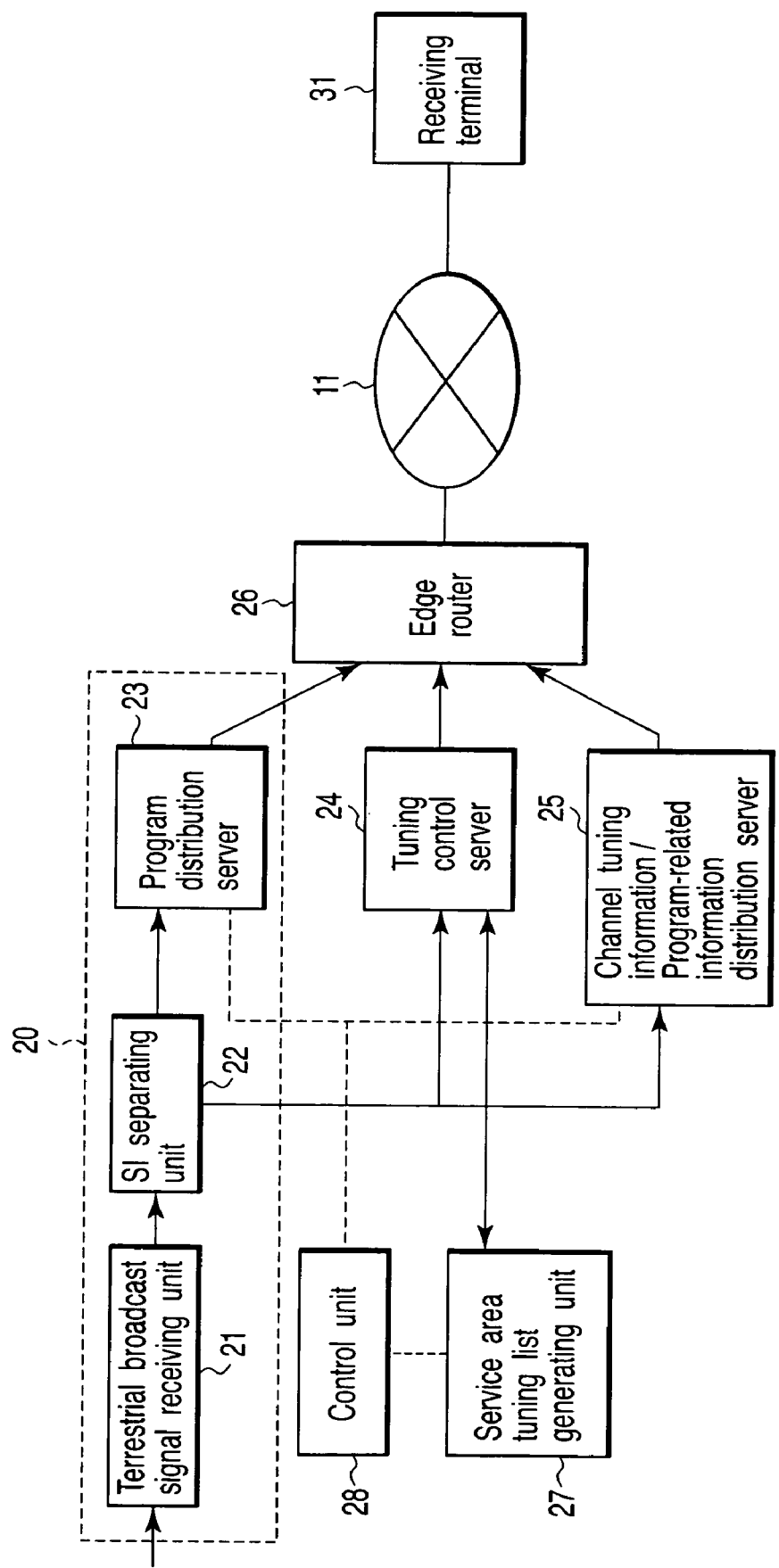
F I G. 11

RETRANSMISSION METHOD FOR DIGITAL BROADCAST AND ITS BROADCAST RECEIVING DEVICE

CROSS-REFERENCE TO RELATED APPLICATIONS

This application is based upon and claims the benefit of priority from Japanese Patent Application No. 2005-288625, filed Sep. 30, 2005, the entire contents of which are incorporated herein by reference.

BACKGROUND

1. Field

This invention relates to a retransmission method for a digital broadcast and its broadcast receiving device. More specifically, the present invention relates to, for example, a retransmission method for a digital broadcast and its receiving device which are capable of reducing a burden of an edge router in broadcasting an Internet protocol (IP) broadcast.

2. Description of the Related Art

In recent years, a so-called IP broadcast employing an IP multicast distribution technology has started in a communication network. The IP broadcast utilizes transmission information such as a multicast address to transmit broadcast signals. A receiver acquires the transmission information corresponding to a broadcast channel in advance and tunes a desired program by notifying a multicast address assigned to the desired program to an edge router on a transmission side via a higher order router to be connected. An Internet group management protocol (IGMP) is used for an IP v4, and a Multi Listener Discovery (MLD) is used for an IP v6 as protocols, respectively.

In the IP broadcast, a retransmission of a terrestrial digital broadcast will also be supposed in future years. A digital broadcast generally performs a multiplex transmission of channel tuning information and program-related information as a broadcast signal in a form of a Transport Stream (TS) defined by MPEG-2 systems together with a video/audio signal of a program. An encoding transmission system of the channel tuning information and the program-related information is defined by ARIB-STD B10 etc. and composed of a variety of types of information tables also referred to as Service Information (SI).

More specifically, the channel tuning information with the transmission frequency, etc., described therein is described in each table of a network information table (NIT), a broadcaster information table (BIT) and a service description table (SDT), and the event information is described in an event information table (EIT).

The receiver acquires these items of the information to utilize them to tune programs and to display program-related information such as an electronic program guide (EPG).

For the terrestrial digital broadcast, especially, each broadcasting station performs a multiplex transmission of only its own SI on its own broadcast signal. Therefore, the receiver sequentially channel-searches broadcasting channel frequencies capable of receiving within a service area, appropriately, for instance, after power supply of the receiver is turned on, to acquire and update the SI, such as the channel tuning information and the program-related information. In other words, the existence of a plurality of broadcasting stations that may be accessed within the service area makes the receiver scan the plurality of broadcasting channel frequencies to acquire the SI of each broadcast station. Here, it is defined that the search of an unknown channel is referred to as 'channel search' and the sequential changes in channel frequencies of known broadcasts are refereed to as 'channel scan'.

Incidentally, for the retransmission of the terrestrial digital broadcast by the use of the system of the IP broadcast, a transmission of a description part on a transmission frequency, etc., of the NIT by replacing it to the description on the IP multicast address, etc., at a retransmission side, like a trans-modulation in a CATV head-end is a possible approach.

However, if a large number of receivers to which the broadcast signals are distributed intend to perform channel scanning in order to acquire and update the SI like an ordinary reception of the broadcast signals being on the air (broadcasted), frequent channel-change requests may occur to the edge router on the transmission side. The higher the number of the receivers to which the broadcast signals are distributed, the higher the treatment burden of the edge router is. And when the burden exceeds a processing capability, the whole distribution system probably fails.

To countermeasure the failure, for instance, Jpn. Pat. Appln. KOKAI Publishing No. 2005-38340 discloses a method for describing version numbers of other broadcasting stations in broadcast signals from each terrestrial broadcasting station to broadcast them by changing the SI transmission operation of the current terrestrial broadcast and for performing the multicast transmission of the SI by all stations via a communication network. However, it is not easy for this publicly-known example to change the current broadcasting operations from the aspect of interference on existing broadcast receiver and it is needed for each terrestrial broadcast station to modify facilities for both broadcast and communication, so that this publicly-known method is extremely hard to be realized.

According to one aspect of this invention, an object of the present invention is to provide a method and a device which is capable of performing the retransmission of the digital broadcast signals through the IP broadcast and capable of operating smoothly and simply on both transmission and reception sides without having to change the operations and facilities for the current terrestrial broadcast.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an explanatory view showing a configuration example of a broadcasting system with the present invention adopted thereto;

FIG. 2 is an explanatory view showing a configuration block example of a receiving terminal 31 in FIG. 1;

FIG. 3 is an explanatory view showing an example of mutual signal transmissions between the receiving terminal 31 and a server on a transmitting device side in FIG. 1;

FIG. 4 is an explanatory view showing an example of a data structure of a service area tuning list used in the present invention;

FIG. 5A is an explanatory view showing an example of a data structure of a version check list used in the present invention;

FIG. 5B is an explanatory view showing an example of a data structure of a version check list used in the present invention;

FIG. 8 is an exemplary view showing a configuration example of a control unit on a receiving terminal 31 shown in FIG. 1;

FIG. 11 is an explanatory view showing a configuration example regarding another embodiment of the present invention.

DETAILED DESCRIPTION

Figure 6:
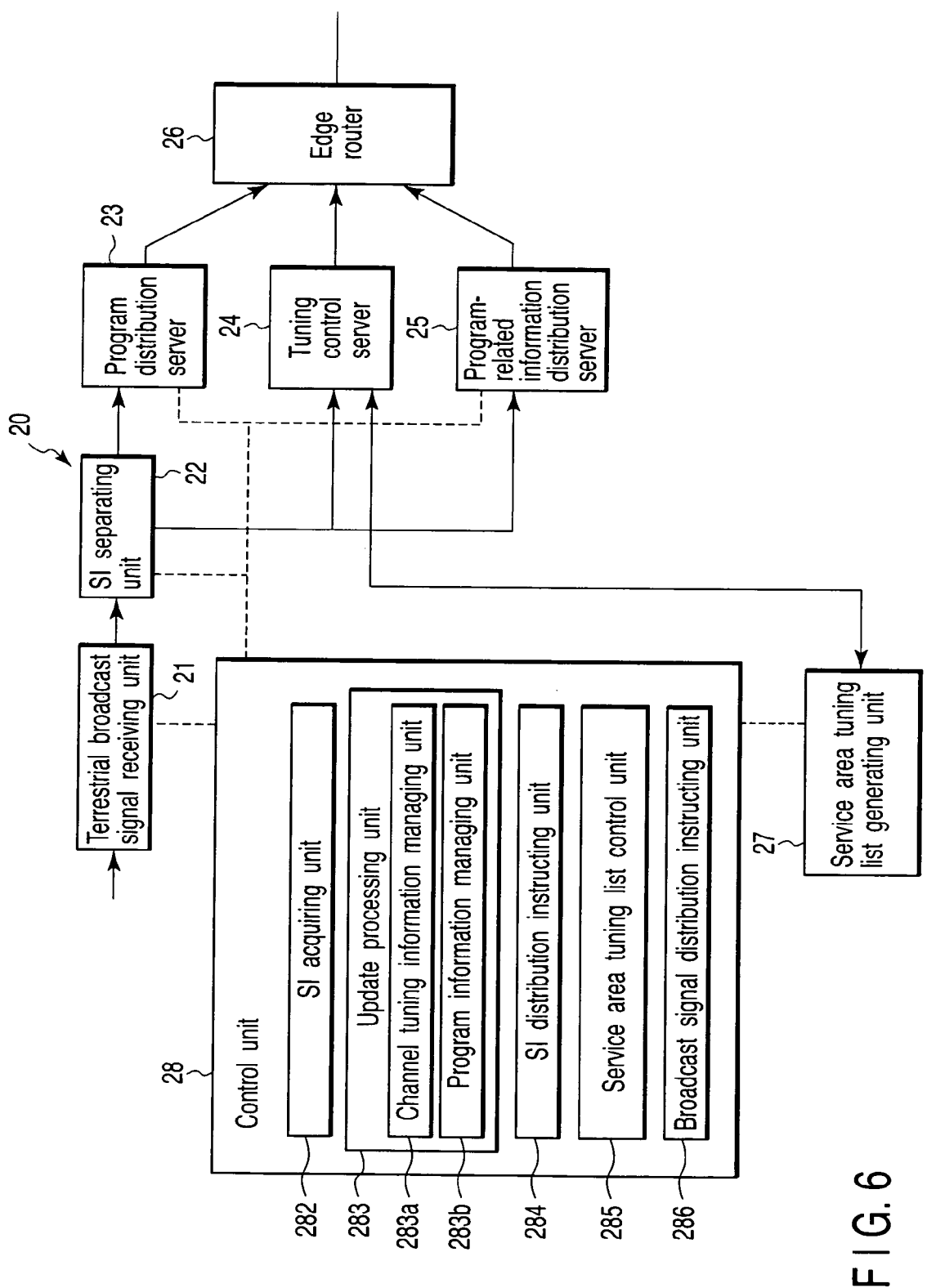
FIG. 6 is an exemplary view showing a configuration example of a control unit on the transmitting device side shown in FIG. 1.

Various embodiments according to the invention will be described hereinafter with reference to the accompanying drawings. In general, according to one embodiment of the invention, an IP broadcast transmitting device comprises means for acquiring and collecting channel tuning information and program-related information from broadcast signals of each broadcasting station from which the broadcast signals are distributed, means for updating and managing the information, means for distributing the information independently from IP multicast-distributions of the broadcast signals, and means for distributing a service area tuning list with IP multicast-distribution information of the broadcast signals and distribution positions of the channel tuning information and the program-related information of the broadcast signals described therein.

Referring first to FIG. 1, there is shown an example of a whole configuration of an IP broadcast system regarding the present invention.

In FIG. 1, a transmitting device 20 performs an IP broadcast. The transmitting device 20 receives digital broadcast signals of each terrestrial broadcasting station from which the broadcast signals are distributed in order to secure real time properties of SI to be distributed. In general, transmitting devices 20 includes a plurality of terrestrial broadcast signal receiving units 21 and a plurality of SI separating units 22 corresponding thereto, respectively. That is, the receiving units 21 and the separating unit 22 are prepared by the number of the broadcasting stations. The receiving unit 21 receives the broadcast signals from the broadcast stations from which the broadcast signals are transmitted. A receiving method receives the broadcast signals by directly being on air (broadcasted), through a dedicated terrestrial line or a dedicated line via a satellite. The receiving unit 21 conducts demodulation processing and error connection decoding processing and outputs the demodulated transport stream (TS) to the separating unit 22.

The separating unit 22 outputs the input TS as it is to a program distribution server 23. The separating unit 22 separates an NIT, a BIT and an SDT as channel tuning information from the TS, and when a control unit 28 detects update, it outputs them to a tuning control server 24 and separates an EIT as program-related information. At this time, when the control unit 28 detects the update of the tuning information, it outputs the EIT to a program-related information distribution server 25.

The program distribution server 23 conducts processing necessary for an IP transmission, such as form IP packet, to the input TS and generates transmission signals to be multicast-distributed. The transmission signals are output to an edge router 26. The tuning control server 24 converts each piece of information on the NIT, BIT and SDT of each broadcasting station into files to control them as the channel tuning information. The tuning control server 24 controls the service area tuning list generated from a service area tuning list generating unit 27 (mentioned below) on the basis of the channel tuning information. Moreover, the tuning control server 24 outputs the latest tuning list so as to unicast-distribute by, for example, an HTTP protocol in accordance with a request from the receiving terminals 31.

The program-related information distribution server 25 converts each item of information of the EIT of each broadcasting station into files. The information in the files is updated and managed as the program-related information and the latest files are output to the edge router 26 in accordance with the request from the receiving terminal 31.

A control unit 28 monitors, as mentioned below, version numbers of each piece of information of the NIT, BIT and SDT of the each separated broadcasting station. Thus, when detecting 'update', the control unit 28 instructs the tuning control server 24 and the information distribution server 25 so as to rewrite the files to the latest ones. The control unit 28 has a version check list table, and when the list table is updated, it describes, for instance, an update flag or update date information in the list table.

The broadcast signals of each broadcasting station multicast-distributed to an IP network 11 via the edge router 26, and each information of the service area tuning list, channel tuning information and program-related information unicast-distributed to the IP network 11 via the edge router 26 are supplied to each receiving terminal 31 connected via access lines such as optical lines or ADSL lines. The receiving terminals 31 are usually connected in residences via line terminating devices, ADSL modems, routers (all of them not shown).

The receiving terminal 31 utilizes the service area tuning list, the channel tuning information and the program-related information have been acquired independently through the unicast distributions, etc. The receiving terminal 31 performs tuning processing and display processing of program-related information, such as an EPG. The receiving terminal 31 reproduces the broadcast signals to display them basically like an on the air (broadcasting) reception other than performing IP processing, etc., of the received broadcast signals.

The service area tuning list is information with the IP multicast distribution information of the broadcast signals and distribution positions of the channel tuning information, and the program-related information of the broadcast signals described therein. The receiving terminal 31 can extract the IP multicast distribution information from among the service area tuning list to set a receiving condition thereof. The receiving terminal 31 can further refer the information on the distribution positions of the channel tuning information among the service area tuning list and the program-related information to acquire the channel tuning information and the program-related information.

FIG. 2 shows a basic configuration of the receiving terminal 31. Although this embodiment is configured to also enable receiving the broadcast signals via broadcast (on the air), the basic configuration will be explained by focusing attention on the case of reception via a communication channel (IP network).

In FIG. 2, a digital broadcast receiving device 101 is composed of a tuner unit 102, a descrambler 103, a TS decoder unit 104, a video/audio decoder unit 105, a display processing unit 106, a control unit 107, key input unit 108, an IC card I/F unit 110, a memory unit 112, and a communication processing unit 111.

The tuner unit 102 tunes a desired channel from broadcast waves input to the receiving device 101 to output the TS in the tuned channel to the desclambler 103. In general, the payload section of the TS is scrambled to protect its content.

The communication processing unit 111 connects to a network line, such as an Ethernet (registered trade mark) to conduct transmission/reception processing of IP packet data via a network. The communication processing unit 111, like the tuner unit 102, receives the broadcast signals converted into IP packets, from the program distribution server 23, performs decoding processing of error correction codes applied in the IP transmission, extracts TS signals from the IP packets and outputs them to the descrambler 103.

The descrambler 103 descrambles the TS input from the communication processing unit 111 and the tuner unit 102 to output the TS to the TS decoder unit 104.

The TS decoder unit 104 separates necessary packets from the TS input from the descrambler 103 on the basis of program specific information (PSI). And furthermore, the TS decoder unit 104 extracts broadcast program signals (videos, sounds) and separates a various types of multiplexed data (each SI data, ECM, EMM, etc.) from the separated packets. The TS decoder unit 104 also outputs the separated broadcast program signals (videos, sounds) to the video/audio decoder unit 105.

In addition, the embodiment utilizes the service area tuning list, the channel tuning information and the SI of the program-related information independently acquired through the unicast-distributions, etc.

The video/audio decode unit 105 decodes the broadcast program signals (videos, sounds) input from the TS decoder unit 104 to output them to the display processing unit 106.

The display processing unit 106 outputs the broadcast program signals (videos, sounds) input from the video/audio decode unit 105 and outputs them to an external monitor (not shown) to display/audio-reproduce them. The display processing unit 106 has a function to generate display image signals of each piece of error information so as to function an interface function to a user. And furthermore, the display processing unit 106 has a function to output the generated image signals as a substitute for the broadcast program signals (videos, sounds) or to synthesize the generated image signals with the broadcast program signals (videos, sounds) to output them. The display processing unit 106 also has a function to generate EPG image signals composed of the SI separated by the TS decoder unit 104 and the SI independently acquired through the unicast-distributions, to output the generated image signals as a substitute for the broadcast program signals (videos, sounds) or to synthesize the generated image signals with the broadcast program signals (videos, sounds) to output them.

The key input unit 108 has a function to receive remote operation signals by infra-red rays, etc., from user interface equipment such as a remote controller 109. The memory unit 112 includes a RAM and a nonvolatile memory, and for instance, the nonvolatile memory stores a part of items of the channel tuning information and the program-related information.

The control unit 107 has a function to integrally control each aforementioned function and controls each function block through a bus connection, a serial communication connection and the like.

The IC card I/F unit 110 is an IC card interface based on ISO 7816, ISO standard.

An IC card 115 conducts contract management and viewing control and includes a CPU 119, a ROM 116, a RAM 117, a nonvolatile memory 120, an I/F unit 118, etc., and is connected with the digital broadcast receiving device 101 through the interface based on the ISO 7816 to be the ISO standard. A card ID and a key proper to the IC card 115 are set at least in advance at the nonvolatile memory 120 in the IC card 115.

The control unit 107 outputs the EMM and the ECM separated from the TS by the TS decoder unit 104 to the IC card 115 via the IC card I/F unit 110. When the EMM has been input from the IC card I/F unit 110, the IC card 115 decodes the EMM with the key proper to the IC card 115 to store the information on a work key (Kw), etc., acquired by a contract, etc to the nonvolatile memory 120 in the IC card 115. When the ECM has been input from the IC card I/F unit 110, the IC card 115 decodes the ECM with the work key (Kw) stored in the nonvolatile memory 120 in the IC card 115. And after determining the possibility of viewing of the program, if it is possible to view, the IC card 115 outputs a scramble key (Ks) to decode a scramble to the digital broadcast receiving device 101.

In the receiving device 101, the control unit 107 sets the scramble key (Ks) that has been input from the IC card 115 to the descrambler 103, then, the descrambler 103 descrambles the content to enable the program to be viewed.

FIG. 3 shows an example of a processing sequence executed through the IP network in this IP broadcast system. The receiving terminal 31 can request the service area tuning list to the tuning control server 24 (processing S1). When this request has been made, the tuning control server 24 performs unicast-distributions of the service area tuning list generated from the service area tuning list generating unit 27 (processing S2). The terminal device 31 can request the files of each piece of the information, on the NIT, BIT and SDT of each broadcasting station, managed as channel tuning information to the tuning control server 24 (processing S3). In response to the request, the tuning control server 24 performs unicast-distributions of the files of the NIT, BIT and SDT (processing S4).

The above-mentioned processing S1-S4 are executed, for example, when the power supply for the receiving terminal 31 is turned on. After this, the processing S1-S4 need not be executed in most cases; however, the receiving terminal 31 may have been set to execute the processing S1-S4, for instance, after a fixed time period has elapsed.

When a user has instructed though the remote controller 109, etc., by using the service area tuning list and the channel tuning information, the receiving terminal 31 notifies channel tuning through a higher order router (not shown) to decide a distribution route from the edge router 26 (processing S5). The program distribution server 23 distributes the broadcast signals (programs) in the corresponding channel in response to the tuning notification (processing S6).

The receiving terminal 31 furthermore can request the EIT file to the program-related information distribution server 25 (processing S7). In response to this request, the information distribution server 25 performs unicast-distributions of the EIT file (processing S8). The processing S7 and S8 are executed, for example, when the version check list has been checked and it is determined that the program guide has been updated. Or, when the power supply for the receiving terminal 31 is turned on, the processing S7 and S8 are executed. Or, the receiving terminal 31 may have been set to execute the processing S7 and S8 after the fixed time period has elapsed.

The receiving terminal 31 can request the version check list to the tuning control server 24 (processing S8). With response to this request, the tuning control server 24 can distribute the version check list (processing S9). The processing S8 and S9 are also executed when the power supply for the receiving terminal 31 is turned on. Or, the receiving terminal 31 may set itself so as to execute the processing S8 and S9 after the elapse of the fixed time period.

FIG. 4 shows one example of the data stricture of the service area tuning list. The information in the service area tuning list includes service area identification (4-1), a version number of the tuning list itself (4-2) and the number of channels transmitted in the service area (4-2).

Furthermore, the tuning list includes a list of broadcasting stations (networks) receivable at every service area (4-4). The tuning list also includes a correspondence table (4-7) between each broadcast signal (TS) identification (4-5) and transmission information required to perform the IP multicast-distributions (4-6). The information necessary for the IP multicast-distributions include multicast addresses, source addresses and port numbers.

The tuning list further describes, as the information in the service area tuning list, arrangement positions (4-8), (4-9), (4-10) and (4-11) of the respective corresponding files of the NIT, BIT, SDT and EIT. A position (4-12) is an arrangement position of the version check list.

The data structure may include flag information (4-13) and (4-14). The flag information (4-13) is utilized as, for instance, a flag to indicate the presence or absence of the error correction information. Because the IP broadcast transmits broadcast signals with the error correction codes proper to the IP added therein sometimes, and transmits the broadcast signal with the error correction codes differing in strength depending on line conditions added therein sometimes. The flag information (4-14) is, for example, information showing whether the IP broadcast is now broadcasting an emergency broadcast or not.

The receiving terminal 31 obtains the tuning list, for example, after the power supply is turned on at the first time, then, makes it possible to receive the broadcast signals of the retransmission by the IP multicast-distributions on the basis of the aforementioned correspondence table. The receiving table 31 acquires each piece of information of the NIT, BIT, SDT and EIT in accordance with the arrangement positions of each file thereof. Furthermore, the receiving terminal 31 acquires the version check list on the basis of the arrangement positions of the version check list of each file (sub table) which has similarly described and confirms it. Thereby, the receiving terminal 31 can effectively update check processing and acquisition management processing of each file of the NIT, BIT, SDT and EIT.

The tuning list itself is probably updated by being added the broadcasting stations from which the broadcast signals are distributed, so that the receiving terminal 31 manages to confirm the version number (4-2) of the tuning list itself in order to perform the update check processing and the acquisition management processing.

FIG. 5A and FIG. 5B show data structure examples of the version check lists. FIG. 5A shows an aspect in which each file of the NIT, BIT and SDT is created and managed. In this example, each file of each information table of all broadcasting stations from which the broadcast signals are distributed are integrally managed to hold the version numbers individually added to the files themselves. The receiving terminal 31 can effectively perform the update check processing and the acquisition management processing, based on the information tables and the version numbers. The example shown in FIG. 5A describes an area code (5-1A), an integrated version number of the list itself (5-2A) and version numbers of each file of each NIT, BIT and SDT (5-3A). The change in any one of the versions of each file of each NIT, BIT and SDT causes a change in the version number of the list itself (5-2A). Such a processing is because the receiving terminal 31 can recognize the fact of the change in the version of any file by checking only the version number (5-2A) of the check list.

When detecting the change in the version number (5-2A), the receiving terminal 31 may further obtain each file of the NIT, BIT and SDT or may directly obtain each file from a signal being on the air (broadcasted), i.e., an output signal from the tuner unit 102. Even though the check list has enumerated the version numbers of each sub table of the NIT, BIT and SDT, the receiving terminal side may update to detect the version numbers and acquire only required sub tables.

FIG. 5B shows an aspect in which the file of the EIT is created to be managed at every table type. Similarly, the receiving terminal 31 can effectively conduct the update check processing and the acquisition management processing on the basis of the EIT. Accordingly, an area code (5-1B) and an integrated version number of the list itself (5-2B) are defined here. The EIT includes the version numbers of the EIT (5-3B), (5-4B) and (5-5B). The reason for the presence of the plurality of the version numbers is that, for example, broadcast program-related information of three days ahead is recorded, broadcast program-related information of one week ahead is recorded, or broadcast program-related information of three weeks ahead is recorded, respectively.

Having described the case where the service tuning list and the version check list in XML description forms are acquired and processed in this embodiment, embodiments of the present invention are not limited to this environment and form in the described case. For instance, the lists may be acquired through a broadcast and the data structure may be described in a section form at a broadcast.

The IP network 11 is a content delivery network (CDN) suitable for a content distribution with a high rate and usually has a closed network structure. The IP network 11 uses the IP without distinction of its version v4 or version v6.

Next to this, the NIT to be transmitted in a packet included in the TS in the terrestrial digital broadcast will be described additionally. The NIT includes a variety of types of items of information required to receive programs. The NIT includes information as it is indicating physical conditions called a terrestrial distribution system descriptor in a terrestrial transmission channel, as the case may be. In this case, the receiving terminal 31 has to appropriately neglect the information. The NIT also includes a remote control key id. The control key id is usually used in order to assign key numbers of the remote controller 109 for selecting programs. For instance, if the control key id has been transmitted in a certain TS is '1', the key number '1' of the remote controller 109 is corresponded as a key number to receive a representative program in the TS corresponding to the key id. The NIT includes information for service identification (service_id), which indicates a service list (service list). The service list is, for example, a list indicating selection numbers to select a category (each category if there are a plurality of categories) of programs and programs (including representative program) which have been broadcasting in the TS in the received channel.

As mentioned above, in the case where the broadcast signals are on the air, the NIT has set the key number of the remote controller 109; however, the use of the channel tuning information, from the NIT down, as it is for the IP broadcast brings a user into a state of confusion sometimes. Therefore, in the case of the IP broadcast, to set the key number of the remote controller 109, it is probably preferable for a key operation of the remote controller 109 to be done in a unique form in receiving the IP broadcast. This will be further explained later in the description of the control unit 107 of the receiving terminal 31.

FIG. 6 shows details of each block of the control unit 28 of the transmitting device 20. An SI acquiring unit 282 acquires to manage the necessary latest SI, such as an NIT, SDT, BIT and EIT. An update processing unit 283 performs update processing of the channel tuning information and the program-related information and includes a channel tuning information managing unit 283a and a program-related information managing unit 283b.

An SI distribution instruction unit 284 performs unicast-distributions of the channel tuning information and the program-related information independently from the IP multicast-distributions of the broadcast signals, in cooperation with the tuning control server 24 and the program-related information distribution server 25. A service area tuning list control unit 285 and a service area tuning list generating unit 27 generates a service area tuning list with the IP multicast-distribution information and distribution positions of the channel tuning information and the program-related information of the broadcast signals described therein and also distributes them to the receiving terminal 31 has requested them.

Figure 7:
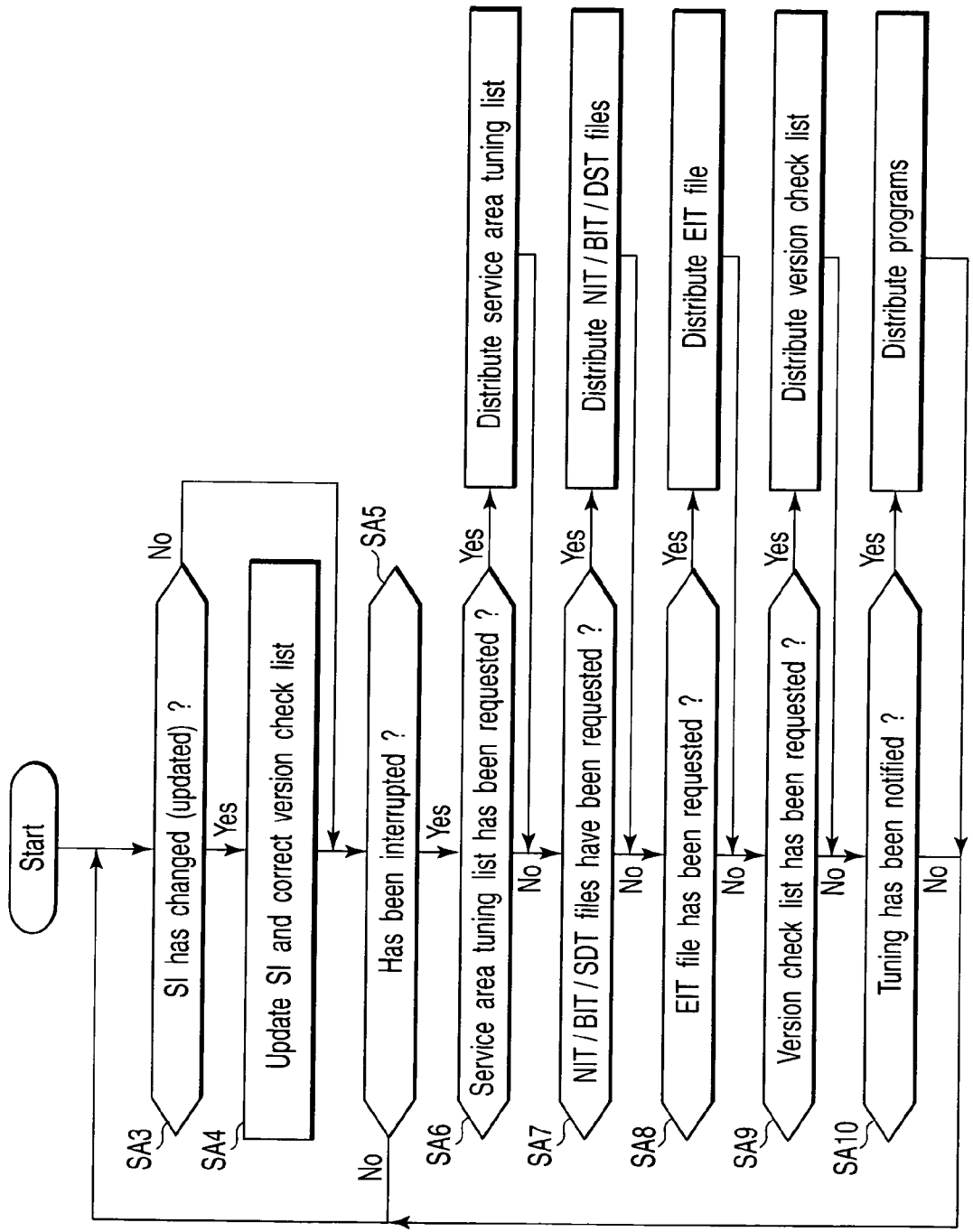
FIG. 7 is an exemplary flowchart showing an operation example on the transmitting device side shown in FIG. 1.

FIG. 7 shows an example of the control operation of the control unit 28 in a flowchart. The control unit 28 extracts the SI to update and detect it (step SA3). If the SI has been updated, the control unit 28 performs update processing of the SI and correction processing of the version check list (step SA4).

The control unit 28 determines whether the receiving terminal 31 has interrupted or not (receiving terminal 31 has requested or not) (step SA5), if the receiving terminal 31 has interrupted, the control unit 28 determines request contents. The contents are sequentially determined in accordance with a step SA6 (request for service area tuning list), a step SA7 (request for NIT, BIT, SDT files), a step SA8 (request for EIT file), a step SA8 (request for EIT file), a step SA9 (request for version check list) and a step SA10 (tuning notification), and processing corresponding to each operation is executed, respectively. The sequence of the steps SA3-SA10 is an example and the sequence is not limited to the sequence mentioned above.

As described above, the transmitting device 20 retransmits the broadcast signals in terrestrial broadcast toward the IP network. The transmitting device 20 has a channel tuning information and program-related information acquiring and collecting means for acquiring and collecting the channel tuning information and the program-related information from the broadcast signals of each broadcasting stations from which the broadcast signals are distributed. The transmitting device 20 also has an updating and managing means for updating and managing the channel tuning information and the program-related information. The transmitting device 20 further has a channel tuning information and program-related information distributing means for distributing the channel tuning information and the program-related information independently from the IP multicast-distributions. The transmitting device 20 also has a service area tuning list distributing means for distributing the service area tuning list with the IP multicast-distribution information and distribution positions of the channel tuning information and the program-related information of the broadcast signals described therein.

FIG. 8 shows a control block in the receiving terminal 31 further thoroughly. The control unit 107 includes a service area tuning list requesting unit 107a, an NIT/BIT/SDT file requesting unit 107b, an EIT file requesting unit 107c, a version check list requesting unit 107d and a tuning notifying unit 107g.

The control unit 107 further has an acquisition method control unit 107e of the channel tuning information and the program-related information and an acquisition control unit 107f of the channel tuning information and the program-related information. The control units 107e and 107f are control units required because the receiving terminal 31 receives the IP broadcast signals. For example, in receiving the IP broadcast signals, the receiving terminal 31 detects, for example, a change in version of the program-related information sometimes, as a result of checking the version check list. In that case, the receiving terminal 31 can acquire the updated program-related information from the server 23-25; however if the program-related information is one of the broadcasting station has been accessing, the receiving terminal 31 may directly acquire it from the multiplexed broadcast signals being on the air (broadcasted). In such a case, for instance, the update of the acquisition of the channel tuning information and the program-related information enables setting so as to acquire the program-related information from the broadcast signals being on the air (broadcasted). The block achieving this setting is the acquisition method control unit 107e and the block operating in accordance with the setting by the control unit 107e is the acquisition control unit 107f of the channel tuning information and the program-related information.

The control unit 107 further includes a time information processing unit 107h. The digital broadcast being on the air (broadcasted) transmits a current time information time offset table (TOT) together with the broadcast signals. The IP broadcast signal is in a manner in which it is taken in the server 23-25 once and distributed therefrom, so that the current time information which has been transmitted indicates a time getting behind the current time. As a result, the receiving terminal 31 cannot indicate the time information as it is sometimes. Therefore, the time information processing unit 107h corrects the time information to display it or neglects the delay of the time.

The control unit 107 moreover includes an error correction code related flag processing unit 107i. The processing unit 107i detects a flag to be its mark when the IP broadcast signals with the error correction code added thereto. The processing unit 107i activates an error correction processing function to perform error correction processing to the IP broadcast signals. In the case of the IP broadcast, it differs from the broadcast being on the air in signal transmission environment. So that the error correction codes unique to the IP broadcast are added to the broadcast signals, and this is the reason the control unit 107 has the processing unit 107i.

Moreover, the control unit 107 has an emergency broadcast related flag processing unit 107j. The processing unit 107j can detect the flag (has been described in FIG. 4) indicating the fact of being in an emergency broadcast, through the IP broadcast signals. When the flag is detected, the processing unit 107j can forcibly change the receiving channel of the receiving terminal 31 to the emergency broadcast channel and its program, in the case of an emergency broadcast-compliant receiver.

The control unit 107 further comprises an operation input determining unit 107k to determine a control input from the remote controller 109 and a control input from a menu screen (GUI). The control unit 107 also has a menu screen control unit 107m to display a response to the operation and an operation status of the digital broadcast receiving device 101.

Furthermore, the control unit 107 is provided with a channel tuning information processing unit 107n. The NIT describes, as mentioned above, the key number of the remote controller 109 in the case of the broadcast signals being on the air; however, the use of the NIT as it is in the case of the IP broadcast causes confusions sometimes. Therefore, the processing of selecting the channel, program, etc., after changing transmission media by placing the IP broadcast at the same rank as the terrestrial broadcast, BS broadcast, etc., is a possible approach. In this case, in receiving the IP broadcast, the channel tuning information processing unit 107n neglects a terrestrial distribution system descriptor of the NIT, performs appropriate processing differing in the case of receiving the broadcast being on the air (broadcasted) and operates in cooperation with the menu screen control unit 107m as the GUI in an EPG display and a banner display. The control unit 107 can prevent the user being brought into the confusion by making the receiving device 101 clearly display the fact that the broadcast signals are through the IP broadcast and tune the channel thereof.

Figure 9C:
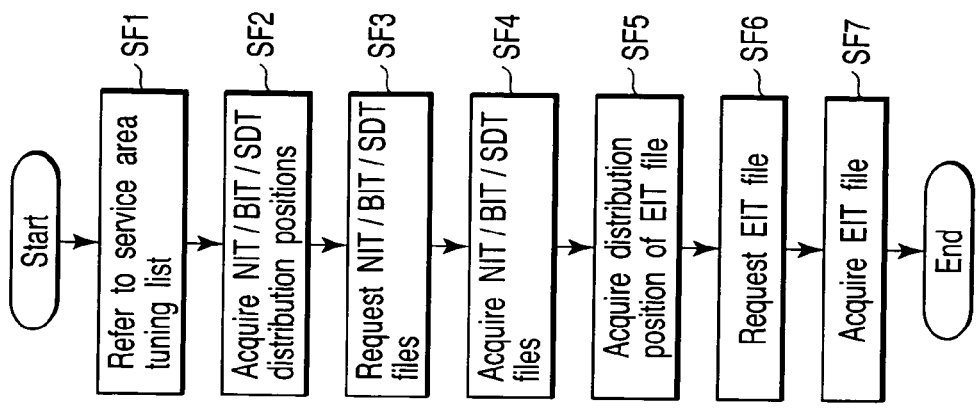
FIG. 9C is an exemplary flowchart showing an operation example of the receiving terminal 31 shown in FIG. 1.
Figure 9B:
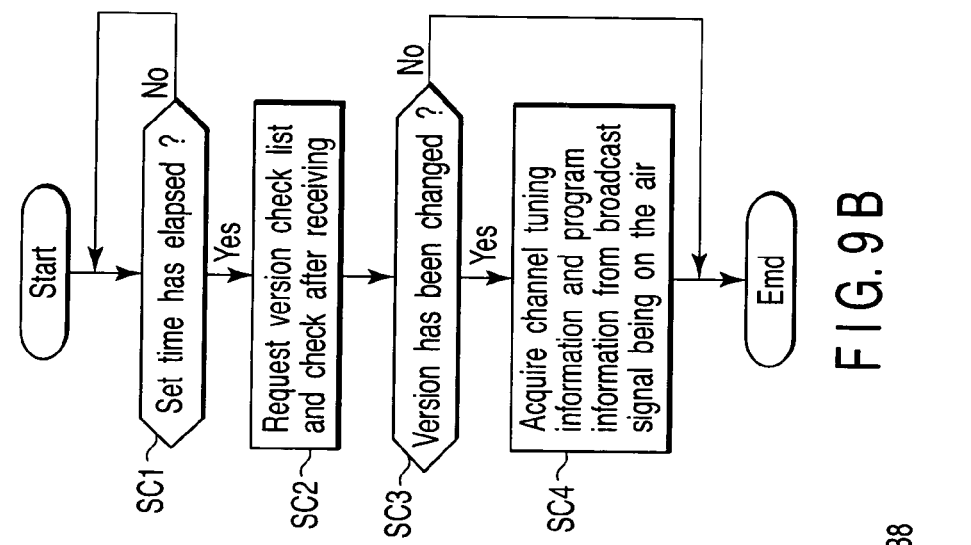
FIG. 9B is an exemplary flowchart showing an operation example of the receiving terminal 31 shown in FIG. 1.
Figure 9A:
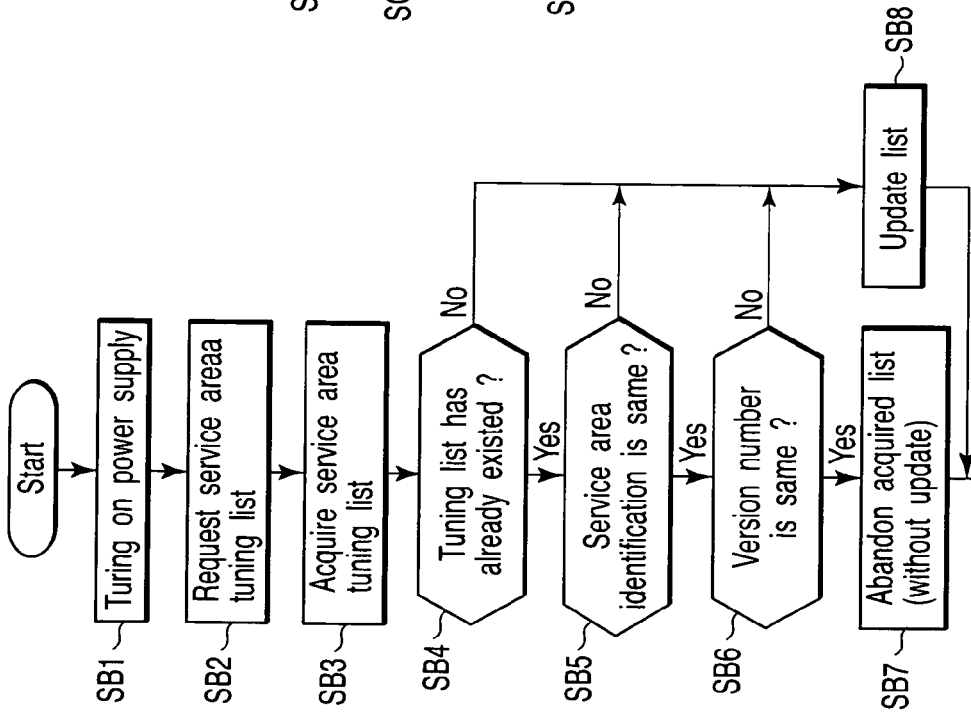
FIG. 9A is an exemplary flowchart showing an operation example of the receiving terminal 31 shown in FIG. 1.

FIGS. 9A, 9B, 9C, 10A and 10B are flowcharts showing the operation examples of the receiving terminal 31, and the operations are achieved by mainly the control unit 107 integrally controlling the receiving device 101. FIG. 9A shows a flowchart in which the receiving terminal 31 operates when it is turned on (step SB1). The receiving terminal 31 requests the service area tuning list to the server 23-25 (step SB2) and acquires it (step SB3). The receiving terminal 31 then determines whether it has already held the tuning list or not (step SB4), and if it has already held the tuning list, it further determines the acquired service area identification information (service list) is the same one which has been already held (step SB5). If the identification information is the same as each other, it further determines whether or not the version numbers are the same each other (step SB6), and if they are identical, it does not perform the update processing and abandon the acquired lists. But if the receiving terminal 31 has not held the tuning list itself, the service area identification (service list) are not identical although it holds the tuning list, and if it determines that the service area identification are identical but the version number has already been changed, it updates/holds the acquired tuning list. The receiving terminal 31 can smoothly conducts the processing corresponding to the re-scanning when the receiving terminal 31 is reinstalled because of, for example, moving house by appropriately updating the service area list on the basis of the service area identification as described above.

Having described the example in accordance with the time when the power supply of the receiving terminal 31 is turned on, the aforementioned operations of the receiving terminal 31 may be conducted at the time of connecting it to the network.

FIG. 9C is a flowchart showing acquisition processing of the NIT, BIT and SDT. The receiving terminal 31 referrers to the service area tuning list which has acquired and stored therein (step SF1) to specifies arrangement positions of each file (step SF2) and requires the files of the NIT, BIT and SDT (step SF3) to obtain them (step SF4). The file of the EIT is similarly obtained (step SF5-SF7) to be stored.

FIG. 9B shows an operation flow to check the version check list. The receiving terminal 31 requires the check list (steps SC1 and SC2), and if a change in the version has detected (Yes, in step SC3), it acquires, for instance, the channel tuning information and the program-related information from the broadcast signals being on the air (broadcasted) (step SC4).

Figures 10A, 10B:
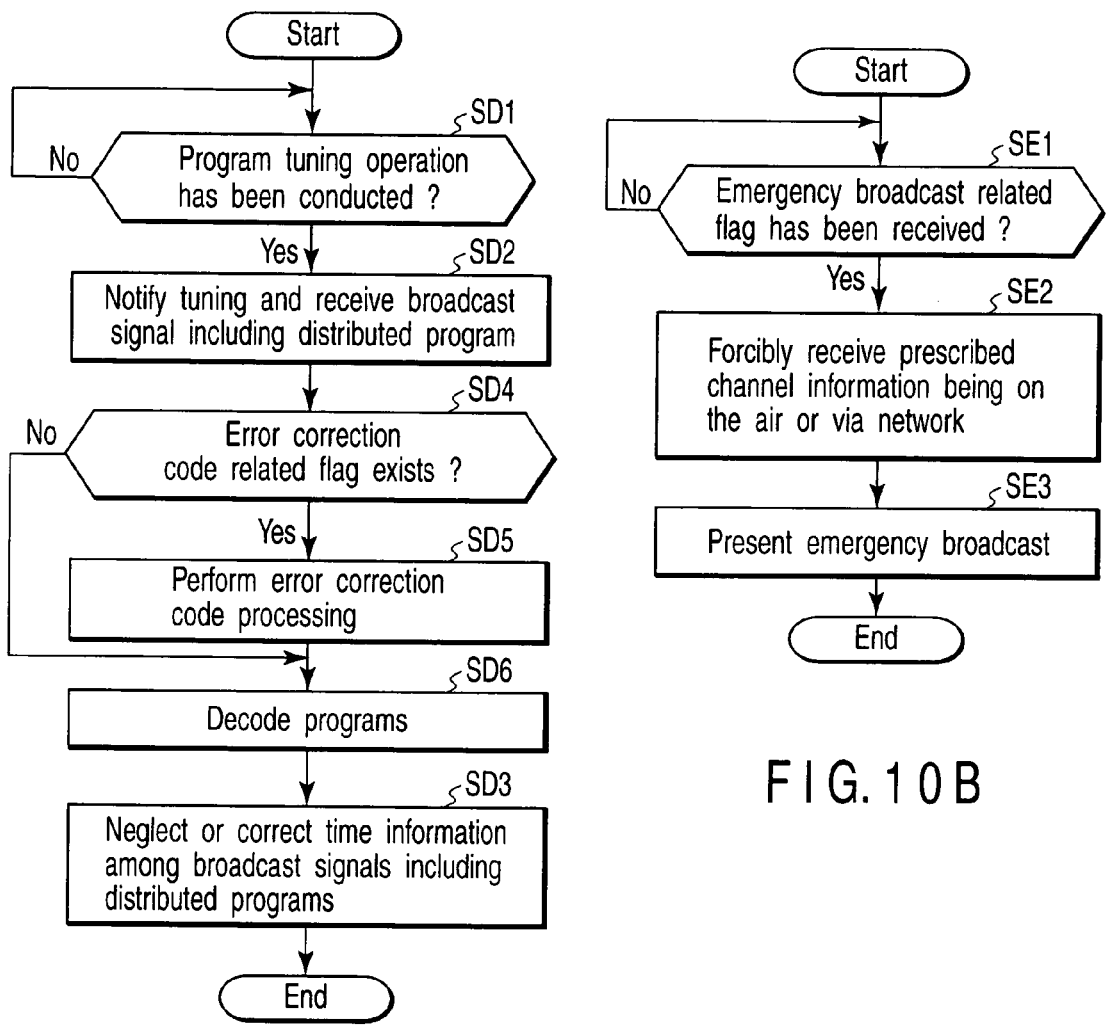
FIG. 10A is an exemplary flowchart showing an another operation example of the receiving terminal 31 shown in FIG. 1.
FIG. 10B is an exemplary flowchart showing an another operation example of the receiving terminal 31 shown in FIG. 1.

FIG. 10A shows an operation flow in the case in which tuning notification is performed. When a user selects a program (step SD1), the receiving terminal 31 performs the tuning notification (step SD2), then receives the IP broadcast signals. At this time, if any error correction related flag exists in the service area tuning list (Yes, in step SD4), it performs the error correction processing to reception signals (step SD5). And decoding processing of video/audio signals of the program are conducted (step SD6). The time information acquired from the TOT is appropriately treated at every receiver (receiving terminal 31) (step SD3).

FIG. 10B is an operation flow when the emergency broadcast related flag is detected (step SE1). The receiving terminal 31 forcibly receives and treats information in a prescribed channel being on the air or being on the network to present an emergency broadcast (steps SE2 and SE3).

At this moment, the emergency flag, capable of identifying that the prescribed channel is an on the air broadcast or a on the network broadcast, may be transmitted. That is, in the case of the on the air broadcast, the receiving terminal 31 selectively uses the prescribed channel as an emergency state over a wider area, and in the case of the IP broadcast, it selectively uses the prescribed channel as an emergency state in a local area.

The invention is not limited to the specific details and representative embodiments shown and described herein, and in an implementation phase, various types of modifications may be made without departing from the spirit or scope of the general inventive concept of the invention. Various types of the invention can be formed by appropriately combining a plurality of constituent elements disclosed in the foregoing embodiments. Some of the elements, for example, may be omitted from the whole of the constituent elements shown in the embodiments mentioned above. The constituent elements over different embodiments further may be appropriately combined. For the file of the SI to be distributed, for instance, the NIT, BIT and SDT may be gotten together and may be distributed integrally.

The above-mentioned embodiment is referred to as a first embodiment then a second embodiment will be described below. Sections corresponding to each block of the first embodiment are put the same symbols as those of the first embodiment. In the second embodiment, the SI to which the multicast-distributions are performed will be described. FIG. 11 shows the example of the configuration of the second embodiment.

The program-related information distribution server 23 of the first embodiment has replaced to a channel tuning information/program-related information distribution server 25 as shown in FIG. 11. The channel tuning information/program-related information distribution server 25 re-multiplexes the SI obtained from each broadcast and performs multicast-distributions in a TS (TS dedicated to SI) form, as the broadcast signals go same. In this case, the service area tuning list describes for instance, a transport stream identifier TSid (corresponding to 4-5) added to the TS only for the SI and the corresponding IP transmission information (corresponding to 4-6), as a substitute for URLs (4-8 to 4-11) indicating arrangement positions of each SI in FIG. 4.

Figure 12:
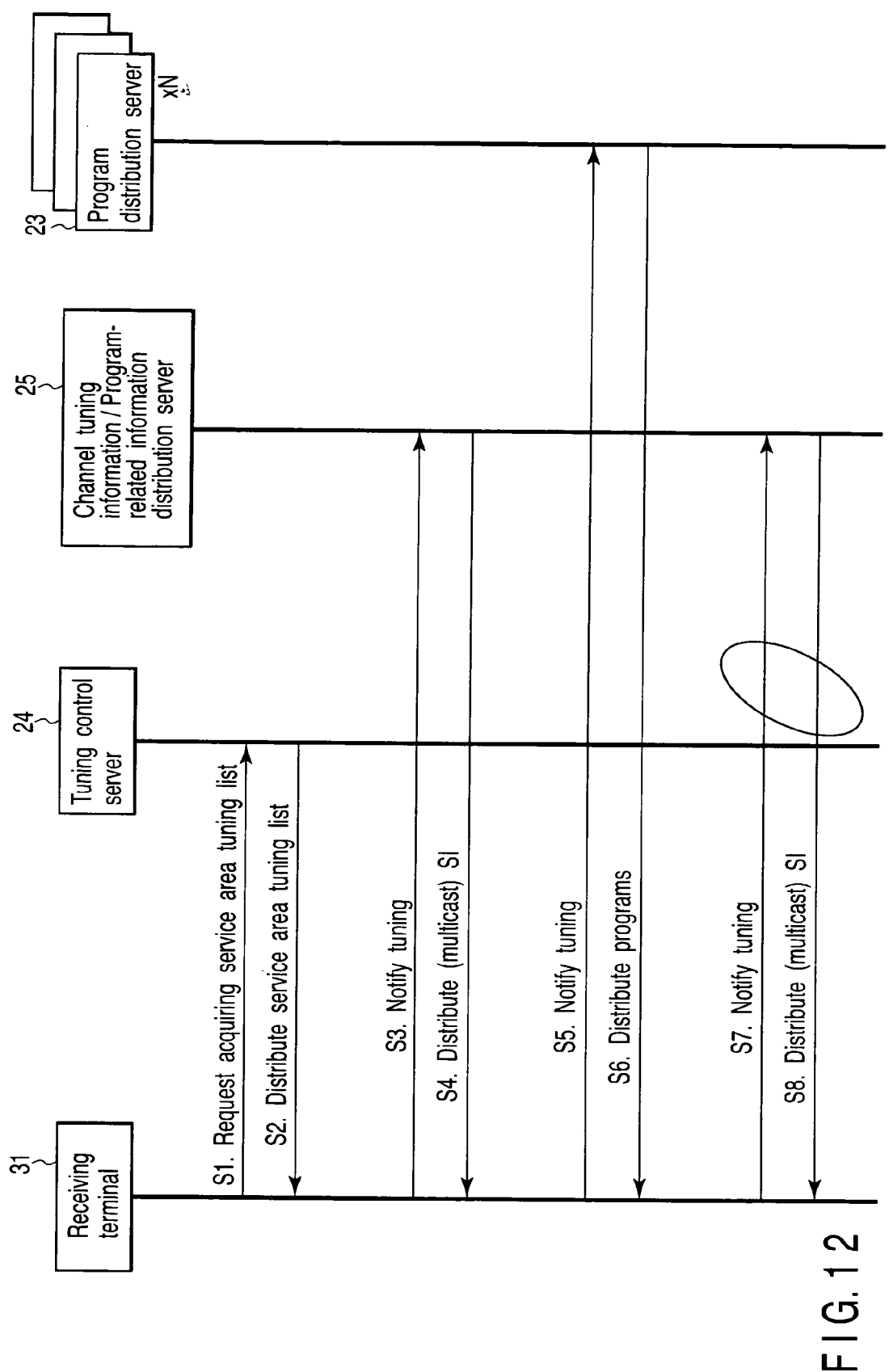
FIG. 12 is an explanatory view showing an example of mutual signal transmissions between a receiving terminal 31 and a server on a transmitting device side in FIG. 11.

FIG. 12 shows an example of processing sequence in the system in FIG. 11. In comparison with the sequence in FIG. 3, the example in FIG. 12 performs the tuning notification of the TS only for the SI on the basis of the aforementioned service area tuning lists in the steps S3 and S4. The receiving terminal 31 acquires the SI from the information muticast-distributed from the program distribution server 23 in the basically same method as that of in on the air (broadcasting) processing. The sequence in FIG. 12 differs from the sequence in FIG. 3 in this point. In the SI distribution (multicast-distribution) in the step S4, the receiving terminal 31 mainly acquires the channel tuning information, and in the SI distribution (multicast-distribution) in the step S8, the receiving terminal 31 mainly acquires the program-related information.

The second embodiment reduces the frequency of channel switching to acquire the SI by re-multiplexing the SI of each broadcast station to a single TS and by integrally performing a multicast-distribution. When re-multiplexing the SI acquired in this method as it is without rewriting a part of it (for example, 'actual' to 'other'), the receiver (receiving terminal 31) receives the SI which should primarily be in a form of other TS in a form of its own TS (actual TS). Depending on a mounting state of the receiving terminal 31 corresponding to such a TS, paying attention to the transmission of the TS and processing differing from the case of on the air (broadcasting) receiving are probably needed. A change in a broadcast operation in terrestrial broadcast is not required and the receiving terminal 31 is rarely affected by adverse effects. The first embodiment in FIG. 1 and the second embodiment in FIG. 11 may be used at the same time. That is to say, the tuning control server 24 may store the channel tuning information and the program-related information to perform the unicast-distributions therefrom.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An IP broadcast transmission method which includes a broadcast signal receiving unit, a service information (SI) separating unit, a program distribution server, a channel tuning control server, a program-related information distribution server, an edge router to transmit outputs from the program distribution server, the channel tuning control server and the program-related information distribution server to an internet protocol (IP) network, a service area tuning list generating unit and a control unit to integral operations of a transmitting device and retransmits broadcast signals to the IP network, comprising: acquiring and collecting channel tuning information and program-related information from among broadcast signals of each broadcasting station from which the broadcast signals are distributed, by the control unit, the broadcast signal receiving unit and the SI separating unit; updating and managing the channel tuning information and the program-related information by the control unit and the broadcast signal receiving unit; performing unicast-distributions of the channel tuning information and the program-related information independently from IP multicast-distributions of the broadcast signals by the control unit, the channel tuning control server and the program-related information distribution server; distributing service area tuning lists with the IP multicast-distribution information of the broadcast signals and distribution positions of the channel tuning information and the program-related information of the broadcast signals described therein, by the control unit and the service area tuning list generating unit; and distributing programs with tuning notification notified thereto, as the broadcast signals, by the control unit and the program-related information distribution server.

2. The IP broadcast transmission method according to claim 1, wherein the channel tuning information describes in a network information table (NIT), a broadcaster information table (BIT) and a service description table (SDT).

3. The IP broadcast transmission method according to claim 1, wherein the program-related information describes in an event information table (EIT).

4. The IP broadcast transmission method according to claim 1, wherein the updating and managing adds integrated version numbers with channel tuning information of all broadcasting stations from which the broadcasting signals distributed integrated therein, independently from each version number added to original channel tuning information of each broadcasting station.

5. The IP broadcast transmission method according to claim 1, wherein the updating and managing adds integrated version numbers with program-related information of all broadcasting stations from which the broadcasting signals distributed integrated therein, independently from each version number added to original program-related information of each broadcasting station.

6. The IP broadcast transmission method according to claim 1, wherein the service area tuning lists include error correction code related flags indicating whether or not error correction codes are added to the broadcasting signals.

7. The IP broadcast transmission method according to claim 1, wherein the service area tuning lists include emergency broadcast related flags indicating whether or not emergency broadcasts are now broadcasted.

8. A broadcast receiving device for receiving IP broadcasts via an IP network from a transmitting device which includes a program distribution server to distribute programs as the broadcast signals, a channel tuning control server to provide channel tuning information, a program-related information, an edge router, a service are tuning list generating unit to describe multicast-distribution information and distribution positions of the channel tuning information and the program-related information and a control unit to integrate operations of the transmitting device and updates to control the channel tuning information and the program-related information, the receiving device comprising: means for acquiring service area tuning list from the service area tuning list generating unit; means for acquiring the channel tuning information and the program-related information on the basis of the service area tuning list; means for performing tuning control processing on the basis of the channel tuning information and the program-related information; and means for neglecting a network information table (NIT) in the broadcast signals distributed via the IP network without utilizing the NIT.

9. A broadcast receiving device for receiving IP broadcasts via an IP network from a transmitting device which includes a program distribution server to distribute programs as the broadcast signals, a channel tuning control server to provide channel tuning information, a program-related information distribution server providing program-related information, an edge router, a service area tuning list generating unit to describe multicast-distribution information and distribution positions of the channel tuning information and the program-related information and a control unit to integrate operations of the transmitting device and updates to control the channel tuning information and the program-related information, the receiving device comprising: means for acquiring service area tuning list from the service area tuning list generating unit; means for acquiring the channel tuning information and the program-related information on the basis of the service area tuning list; means for performing tuning control processing on the basis of the channel tuning information and the program-related information; and means for neglecting time information in the broadcast signals distributed via the IP network without utilizing it and utilizing the time information by applying appropriate correction processing thereto on the basis of a fixed delay.

10. An IP broadcast transmission method which includes a broadcast signal receiving unit, a service information (SI) separating unit, a program distribution server, a channel tuning control server, a channel tuning information/program-related information distribution server, an edge router to transmit outputs from the program distribution server, the channel tuning control server and the channel tuning information/program-related information distribution server to an internet protocol (IP) network, a service area tuning list generating unit and a control unit to integral operations of a transmitting device and retransmits broadcast signals to the IP network, the IP broadcast transmission method comprising: acquiring and collecting channel tuning information and program-related information from among broadcast signals of each broadcasting station from which the broadcast signals are distributed, by the control unit, the broadcast signal receiving unit and the SI separating unit; updating and managing the channel tuning information and the program-related information by the control unit and the broadcast signal receiving unit; distributing service area tuning lists with the IP multicast-distribution information of the broadcast signals and multicast-distribution positions of the channel tuning information and the program-related information of the broadcast signals described therein, by the control unit and the service area tuning list generating unit; performing multicast-distributions of the channel tuning information and the program-related information in response to a request signal by the control unit, the channel tuning control server and the channel tuning information/program-related information distribution server; and performing multicast-distributions of programs with tuning notification notified thereto, as the broadcast signals, by the control unit and the program-related information distribution server.

11. The IP broadcast transmission method according to claim 10, wherein the channel tuning information is described in an network information table (NIT), a broadcaster information table (BIT) and a service description table (SDT) and the program-related information is described in an event information table (EIT).

* * * * *